United States Patent
Baccouche et al.

(10) Patent No.: US 9,731,670 B2
(45) Date of Patent: Aug. 15, 2017

(54) SEQUENTIALLY BUCKLING VEHICLE CRUSH CAN

(71) Applicant: Ford Global Technologies, LLC, Dearborn, MI (US)

(72) Inventors: Mohamed Ridha Baccouche, Ann Arbor, MI (US); Rahul Arora, Royal Oak, MI (US); Saied Nusier, Canton, MI (US); Saeed David Barbat, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/993,171

(22) Filed: Jan. 12, 2016

(65) Prior Publication Data

US 2017/0197571 A1    Jul. 13, 2017

(51) Int. Cl.
*B60R 19/00* (2006.01)
*B60R 19/34* (2006.01)
*B60R 19/02* (2006.01)

(52) U.S. Cl.
CPC ............ *B60R 19/34* (2013.01); *B60R 19/023* (2013.01)

(58) Field of Classification Search
CPC .............................. B60R 19/34; B60R 19/023
USPC .................. 293/132, 133; 296/187.09, 187.1
See application file for complete search history.

(56) References Cited

U.S. PATENT DOCUMENTS

| | | | |
|---|---|---|---|
| 3,995,901 A | 12/1976 | Filbert, Jr. et al. | |
| 6,406,088 B1 | 6/2002 | Tate | |
| 7,617,916 B2 | 11/2009 | Heatherington et al. | |
| 8,123,263 B2 | 2/2012 | Evans | |
| 8,287,013 B2* | 10/2012 | Kano | B60R 19/34 293/133 |
| 2008/0030031 A1* | 2/2008 | Nilsson | B60R 19/34 293/133 |
| 2008/0272529 A1 | 11/2008 | Chervin et al. | |
| 2011/0015902 A1* | 1/2011 | Cheng | B62D 21/152 703/1 |
| 2013/0001963 A1* | 1/2013 | Haneda | F16F 7/123 293/133 |
| 2013/0300138 A1 | 11/2013 | Banasiak et al. | |
| 2015/0314743 A1* | 11/2015 | Matsushiro | B60R 19/023 293/133 |
| 2016/0121830 A1* | 5/2016 | Rabe | B60R 19/34 293/133 |

FOREIGN PATENT DOCUMENTS

DE      102012020318 A1    9/2013

* cited by examiner

*Primary Examiner* — Joseph D Pape
(74) *Attorney, Agent, or Firm* — Frank MacKenzie; Bejin Bieneman PLC

(57) ABSTRACT

A vehicle crush can includes a first portion, a second portion spaced from the first portion, and an intermediate portion extending from the first portion to the second portion. The first portion, second portion, and intermediate portion are aligned on a longitudinal axis and taper from the first portion to the second portion. The crush can has corrugations elongated along the longitudinal axis on the first portion and terminating on the intermediate portion.

17 Claims, 6 Drawing Sheets

SEQUENTIALLY BUCKLING VEHICLE CRUSH CAN

BACKGROUND

An end structure of a vehicle may include a bumper assembly, e.g., a front bumper assembly and a rear bumper assembly, connected to a frame of the vehicle. The bumper assembly may include a bumper beam. The bumper beam is relatively rigid and may be impacted during a collision, e.g., a front-end impact. Crush cans may connect the bumper beam to the frame of the vehicle. Crush cans are designed to buckle to absorb energy during the impact.

There remains a need to increase the fuel economy of vehicles. One way to increase fuel economy is by reducing the overall weight of the vehicle. As such, there is an opportunity to decrease the weight of crush cans while still maintaining their functionality.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION

Figure 1:
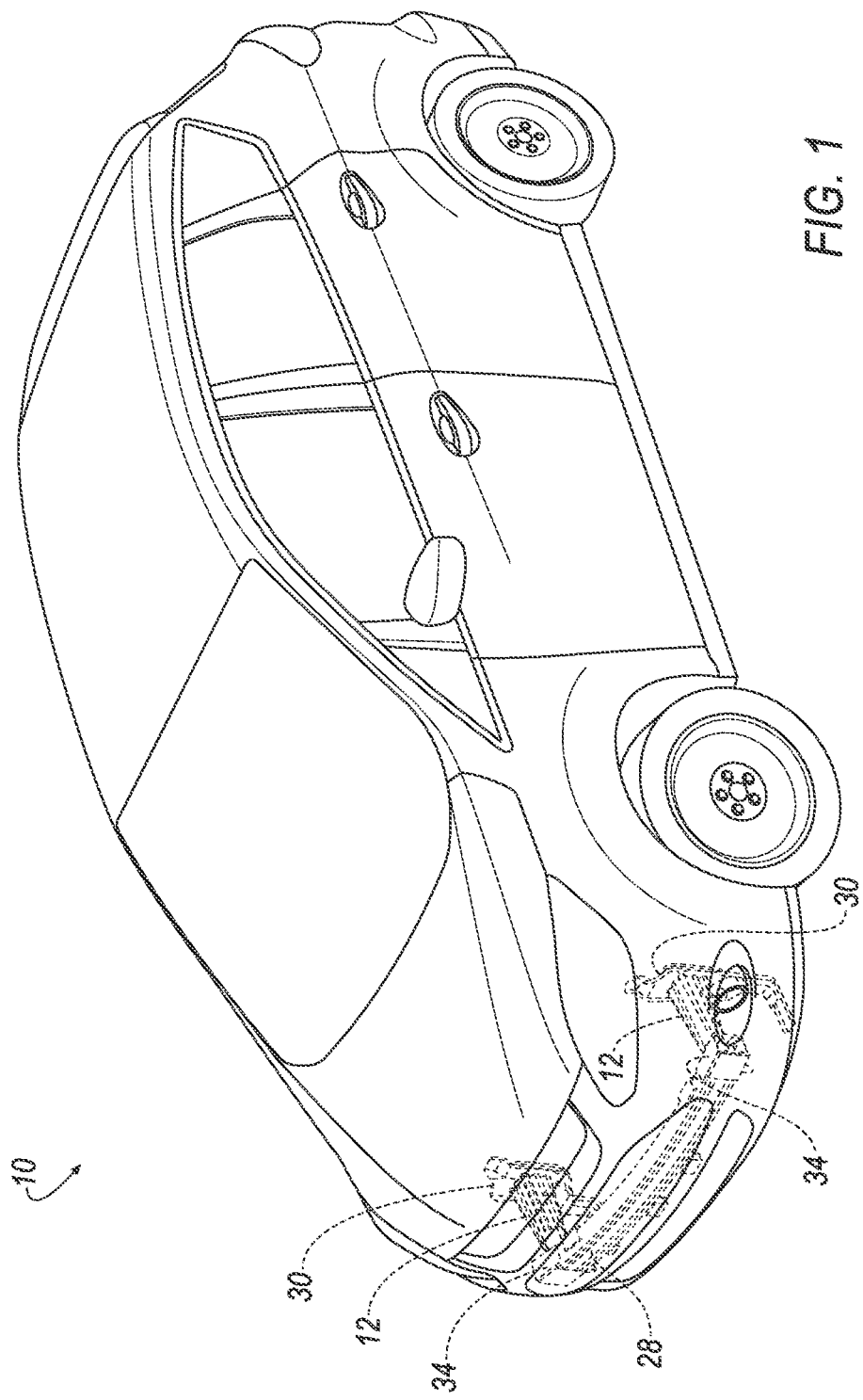
FIG. 1 is a perspective view of a vehicle including crush cans and a bumper beam shown in hidden line.

With reference to the Figures, wherein like numerals indicate like parts throughout the several views, a vehicle 10 includes a frame 26 and at least one crush can 12 extending along a longitudinal axis A. The crush can 12 includes a first portion 16 fixed relative to and proximal to the frame 26, a second portion 20 distal to the frame 26, and an intermediate portion 18 extending from the first portion 16 to the second portion 20. The crush can 12 includes corrugations 24 elongated along the longitudinal axis A on the first portion 16 and terminating on the intermediate portion 18.

Figure 8:
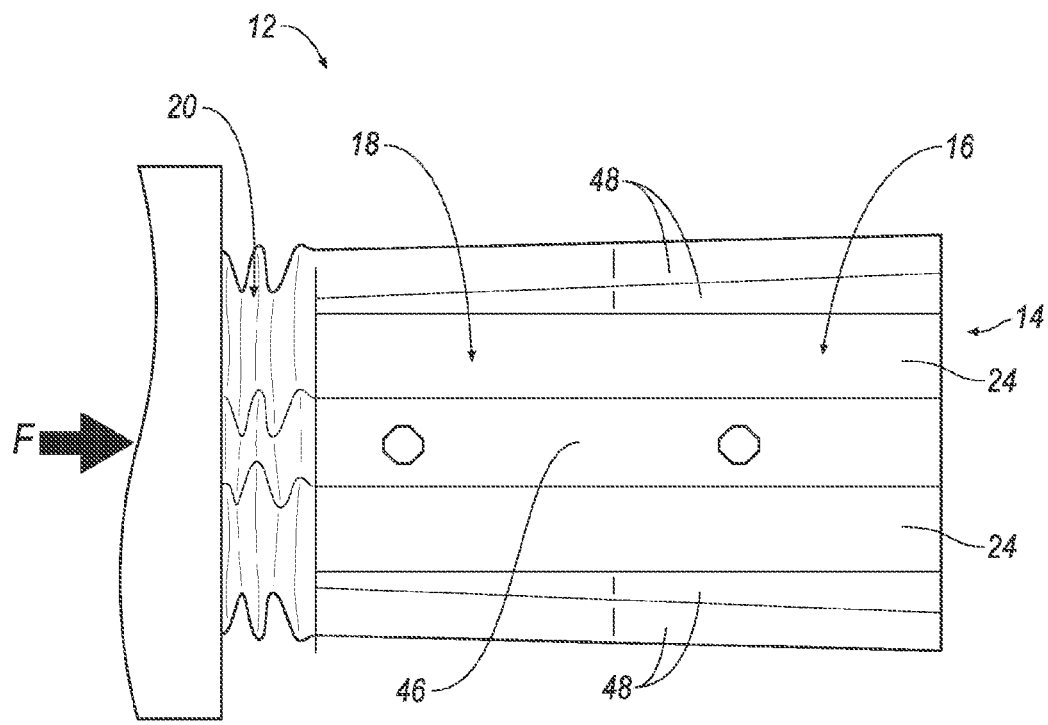
FIG. 8 is a side view of the crush can during a collision with the second portion buckling and the intermediate portion and first portion undeformed.

When a force is applied to the crush can 12, e.g., during a front-end collision of the vehicle 10, the crush can 12 buckles sequentially along the longitudinal axis A. As shown in FIG. 8, upon application of a force F at a distal end 22 of the crush can 12, the second portion 20 of the crush can 12 buckles. Following that, the buckling of the crush can 12 progresses with the intermediate portion 18 buckling (see FIG. 9), followed by the first portion 16 buckling (see FIG. 10), absorbing energy from the force F.

Figure 9:
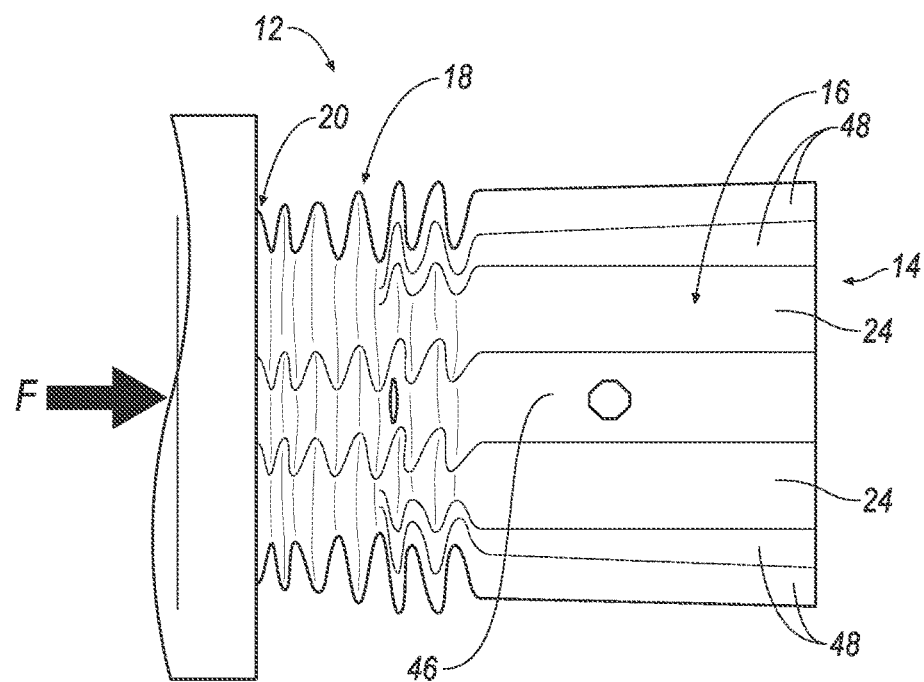
FIG. 9 is a side view of the crush can during the collision with the second portion and intermediate portion buckling and the first portion undeformed.
Figure 10:
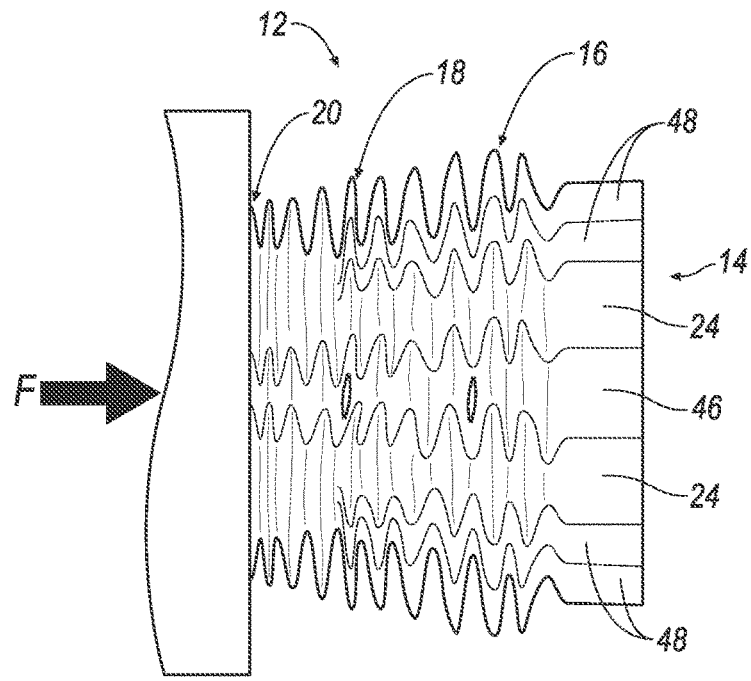
FIG. 10 is side view of the crush can during the collision with the second portion, intermediate portion, and first portion buckling.

Depending upon such variables as the magnitude and duration of force F, the extent the crush can 12 may buckle can vary. For example, and referring still to FIGS. 8 through 10, if the force F is of small magnitude, only the second portion 20 of the crush can 12 may buckle, as shown in FIG. 8. If the force F is of greater magnitude, the second portion 20 and the intermediate portion 18 of the crush can 12 may buckle, as shown in FIG. 9. Finally, as shown in FIG. 10, if the force F is of sufficient magnitude, the crush can 12 may buckle sequentially along the entirety of the longitudinal axis A, from the second portion 20, to the intermediate portion 18, to the first portion 16.

Figure 2:
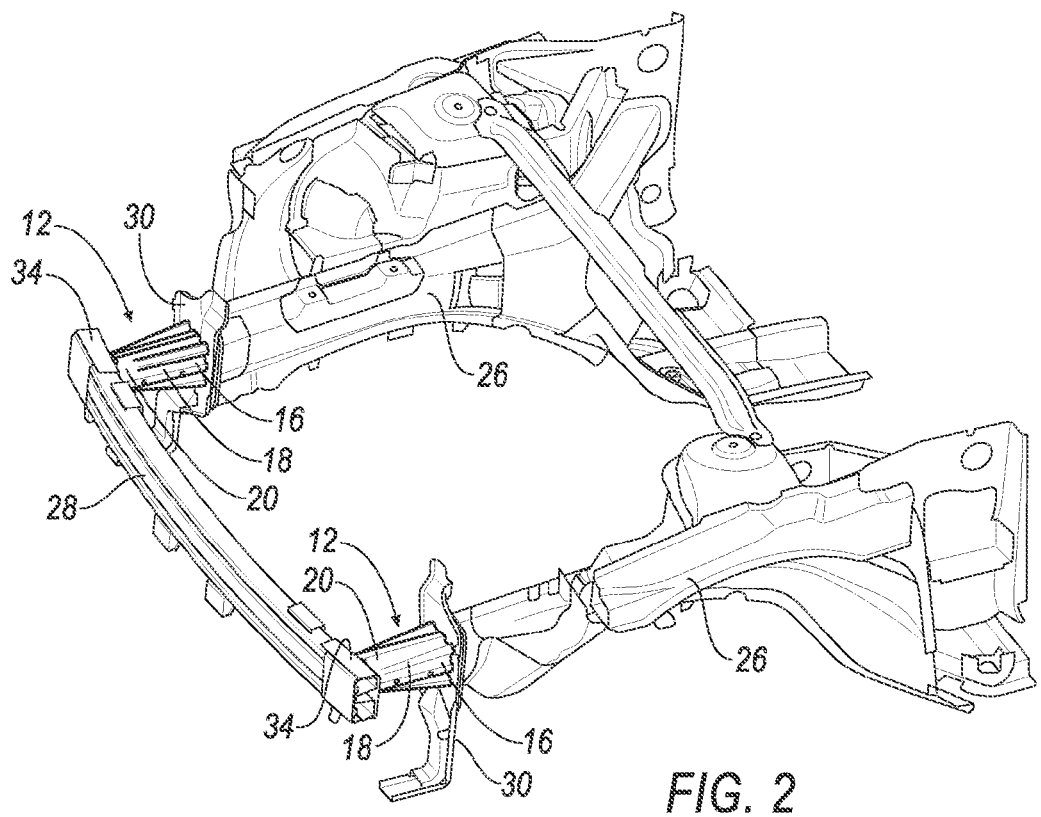
FIG. 2 is a perspective view of a portion of a vehicle including the frame, crush cans, and the bumper beam.

The frame 26 of the vehicle 10 is shown in FIGS. 1 and 2. The frame 26 may be of any suitable construction, e.g., unibody, body-on-frame, etc., and may be formed of any suitable material, e.g., steel, aluminum, etc.

With continued reference to FIGS. 1 and 2, the vehicle 10 includes a bumper beam 28. The bumper beam 28 may be formed of any suitable material, e.g., steel, aluminum, etc. The bumper beam 28 may be configured to deform to absorb energy during an impact of the vehicle 10 and/or may be configured to transmit force to the frame 26 during the impact.

The bumper beam 28 may be supported on the frame 26 by the crush can 12. In particular, as shown in FIGS. 1 and 2, the vehicle 10 may include two crush cans 12 that each extend between the frame 26 and the bumper beam 28 to support the bumper beam 28 on the frame 26. Alternatively, the vehicle 10 may include any suitable number of crush cans 12, i.e., one or more, supporting the bumper beam 28 on the frame 26.

Figure 3:
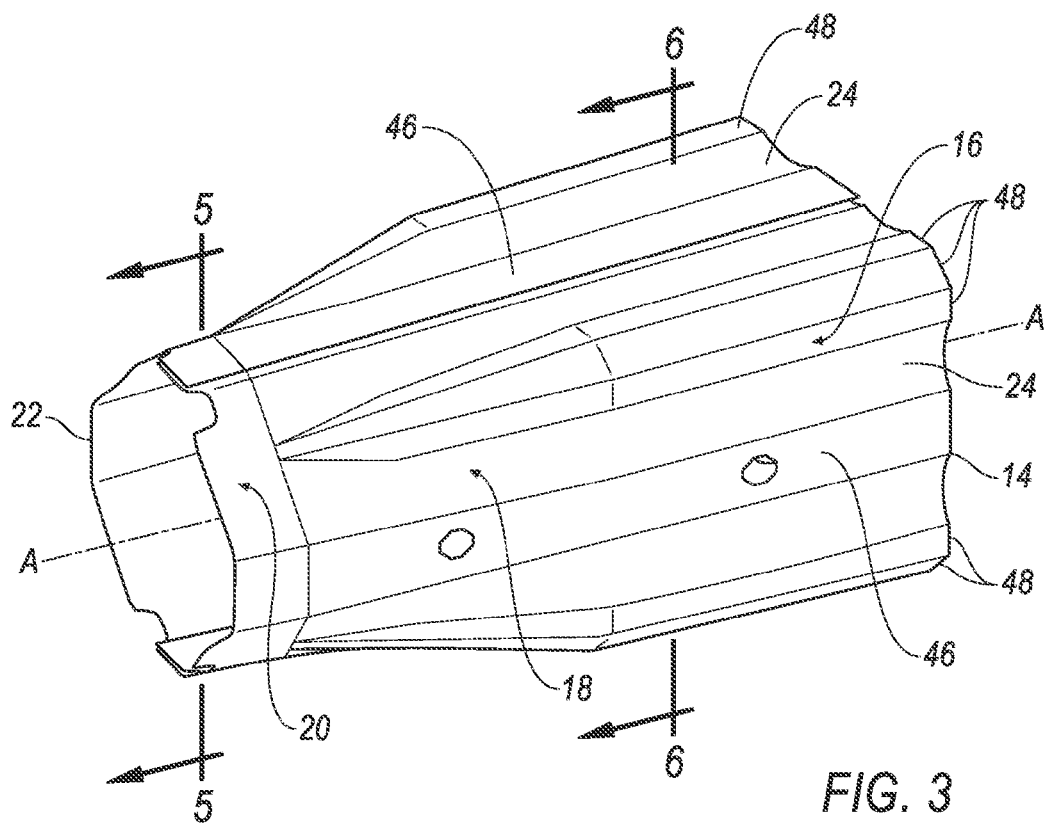
FIG. 3 is a perspective view of the crush can.

With reference to FIG. 3, the crush can 12 may extend from a proximal end 14 on the first portion 16 to the distal end 22 on the second portion 20. The proximal end 14 of crush can 12 is proximate to the frame 26 of the vehicle 10 and the distal end 22 is distal to the frame 26 of the vehicle 10. The intermediate portion 18 extends from the first portion 16 to the second portion 20.

The crush can 12 may include a front plate 34 at the distal end 22, and a rear plate 30 at the proximal end 14. The front plate 34 may couple the crush can 12 to the bumper beam 28, and the rear plate 30 may couple the crush can 12 to the frame 26, as set forth further below. Alternatively, for example, the proximal end 14 and the distal end 22 of the crush can 12 may be directly fixed to the frame 26 and the bumper beam 28, respectively, e.g., by welding, fastening, etc.

The front plate 34 may be fixed to the distal end 22 of the crush can 12 and to the bumper beam 28. Specifically, the distal end 22 of the crush can 12 may be fixed to the front plate 34 in a suitable manner, such as welding, fastening, etc.

Figure 4:
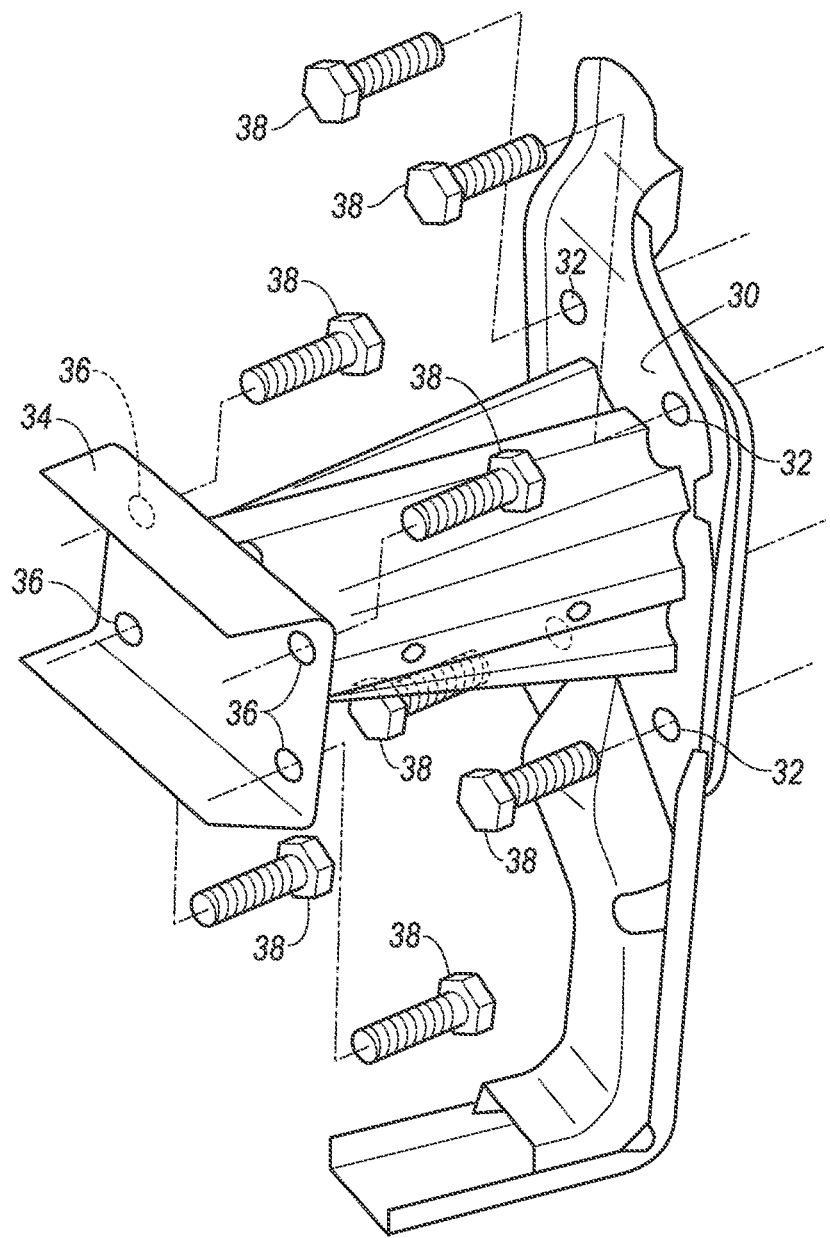
FIG. 4 is a perspective view of the crush can including a rear plate fixed to a proximal end of the crush can and a front plate fixed to a distal end of the crush can.

The rear plate 30 may be removably mounted to the frame 26. For example, the rear plate 30 may define a plurality of holes 32, and the frame 26 of the vehicle 10 may also define holes (not shown) that align with the holes 32 of the rear plate 30. With reference to FIG. 4, fasteners, such as threaded bolts 38, can extend through the holes 32 of the rear plate 30 and into the aligned holes of the frame 26 to removably mount the rear plate 30 to the frame 26 of the vehicle 10. The rear plate 30 may alternatively be welded to or otherwise fixedly joined to the frame 26 in any suitable manner. The rear plate 30 may be formed of metal, such as steel, aluminum, etc.

The front plate 34 may be fixed to the distal end 22 of the crush can 12 and to the bumper beam 28. Specifically, the distal end 22 of the crush can 12 may be fixed to the front plate 34 in any suitable manner, such as welding, fastening, etc.

The distal end 22 of the crush can 12 may be removably mounted to the bumper beam 28. For example, as shown in FIG. 4, the front plate 34 may define a plurality of holes 36, and the bumper beam 28 may define holes (not shown) that align with the holes 36 of the front plate 34. Fasteners such as threaded bolts 38 can extend through the holes 36 of the front plate 34 into the aligned holes of the bumper beam 28 to removably mount the front plate 34 to the bumper beam 28. The front plate 34 may alternatively be welded to or otherwise fixedly joined to the bumper beam 28 in any suitable manner. The front plate 34 may be formed of metal, such as steel, aluminum, etc.

The crush can 12 has a substantially constant wall thickness T from the proximal end 14 to the distal end 22. For example, the wall thickness T may vary between the proximal end 14 and the distal end 22 a minimal amount as a result of tolerances and imperfections from the manufacturing process, e.g., 1-5%. As one example, the wall thickness may be about 1.1 millimeters.

The crush can 12 may be manufactured from ultra high strength steel ("UHSS"). As one example, the crush can 12 may be formed of Boron steel having a yield strength of 1500 MPa. As a result, the crush can 12 has a high strength-to-weight ratio and may be lightweight, and still be designed to maintain a sequence of collapse from the second portion 20, to the intermediate portion 18, to the first portion 16, as set forth further below.

Figure 7:
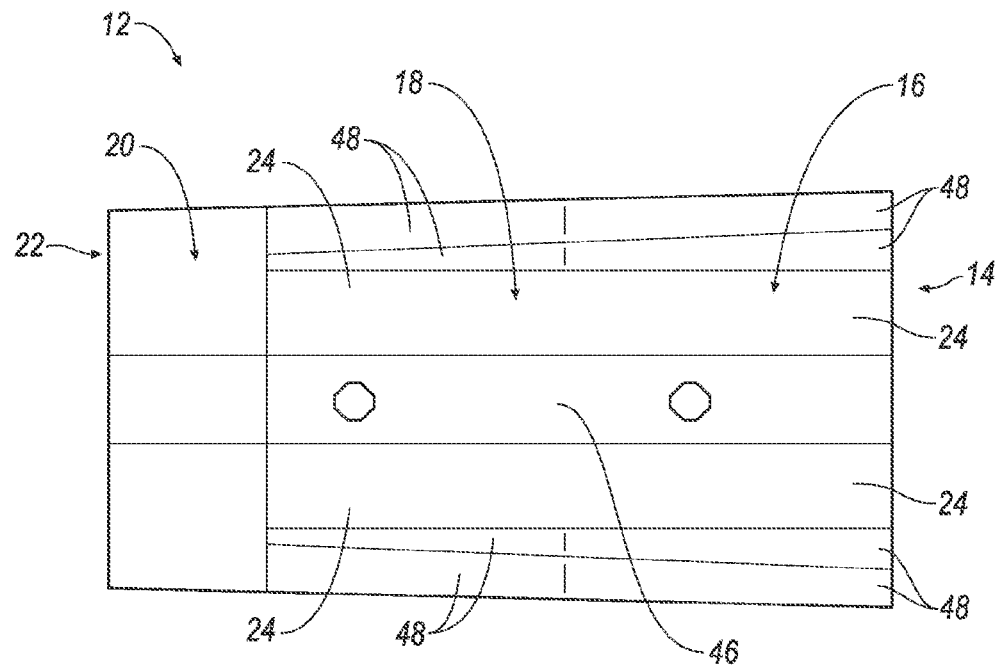
FIG. 7 is a side view of the crush can.

As shown in FIGS. 3 and 7, the crush can 12 may taper from the proximal end 14 to the distal end 22. The taper may be constant from the proximal end 14 to the distal end 22. In other words, the first portion 16, the intermediate portion 18, and the second portion 20 may each taper.

Figure 5:
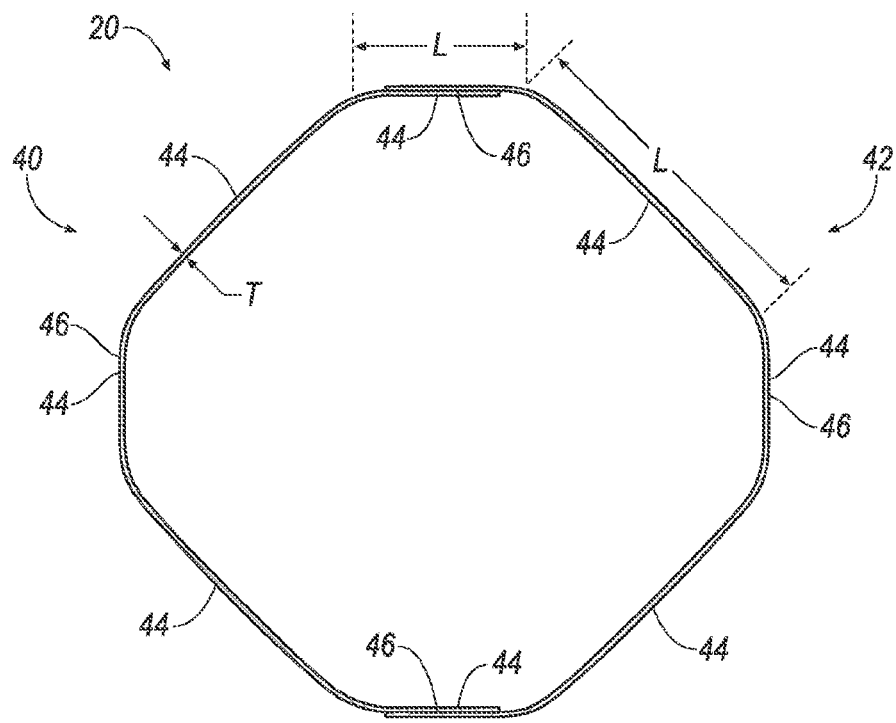
FIG. 5 is a cross-sectional view of a second portion of the crush can.
Figure 6:
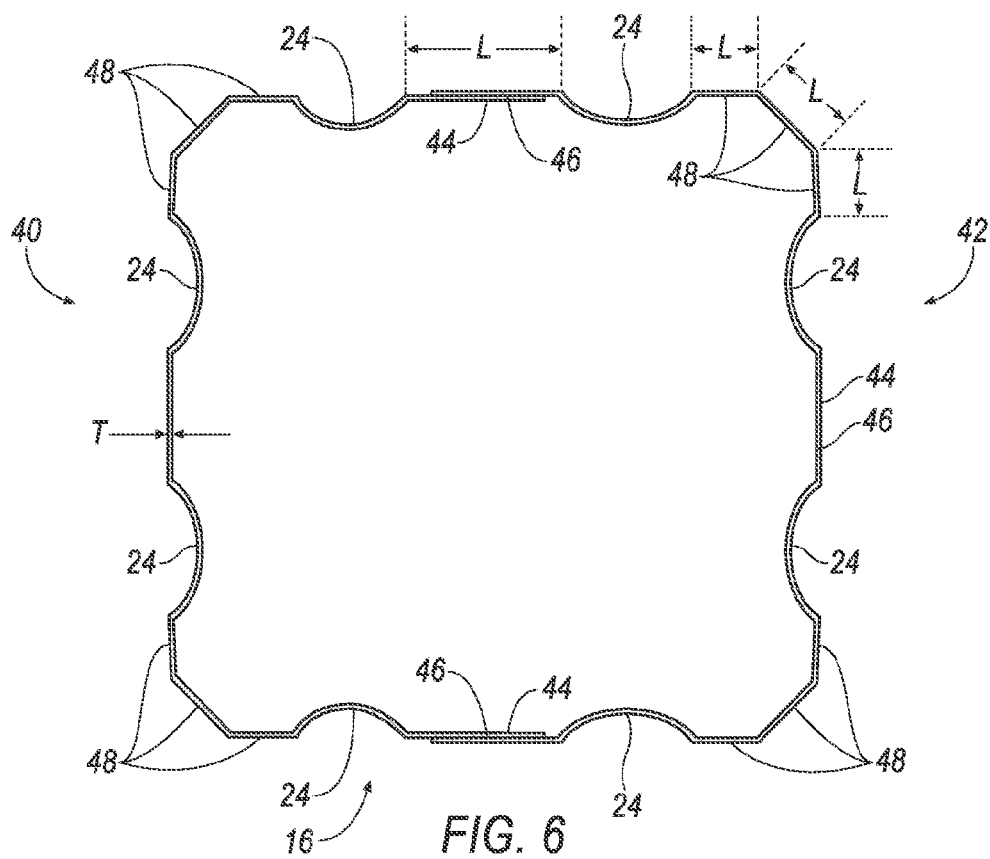
FIG. 6 is a cross-sectional view of a first portion of the crush can.

As shown in FIGS. 5 and 6, the crush can 12 may be fabricated from a plurality of pieces that are fixed together, e.g., welded. For example, as shown in the Figures, the crush can 12 may be fabricated from two pieces, a first piece 40 and a second piece 42.

FIG. 5 shows the second portion 20 of crush can 12 having a polygonal cross-sectional shape defining a plurality of sides 44. For example, the polygonal cross-sectional shape may be octagonal, having eight sides 44. Each side 44 of the crush can 12 has a length L. The length L of each side may vary along the longitudinal axis A, as set forth further below.

Some of the sides 44 are also spines 46 that extend from the proximal end 14 to the distal end 22 of the crush can 12, as shown in FIGS. 3 and 7. Specifically, the spines 46 taper from the proximal end 14 to the distal end 22, as shown in FIGS. 3 and 5-6. In other words, the length L of the spines 46 decrease from the proximal end 14 to the distal end 22.

Some of the sides 44 define ribs 48. As shown in FIG. 3, the ribs 48 may extend from the proximal end 14 of the crush can 12 to the second portion 20, e.g., from the proximal end 14 to an interface of the intermediate portion 18 and the second portion 20. Each rib 48 may have a constant cross-section along the first portion 16, i.e., from the proximal end 14 to the intermediate portion 18. Each rib 48 may taper along the intermediate portion 18. For example, each rib 48 may taper from the first portion 16 to the second portion 20, and may terminate at the interface between the intermediate portion 18 and the second portion 20. In other words, the second portion 20 may be free of ribs 48.

With reference to FIG. 3, the corrugations 24 are elongated along the longitudinal axis A. One corrugation 24 may be disposed between each adjacent rib 48 and spine 46.

The corrugations 24 extend along the first portion 16 and the intermediate portion 18. For example, the corrugations 24 may start at the proximal end 14. As set forth above, the corrugations 24 may terminate on the intermediate portion 18. For example, the corrugations 24 may terminate at the interface of the intermediate portion 18 and the second portion 20, as shown in the Figures. In other words, the second portion 20 may be free of corrugations 24, as shown in FIGS. 3 and 5. The corrugations 24 may extend continuously from the proximal end 14 to the interface of the intermediate portion 18 and the second portion 20.

The corrugations 24 may taper from the first portion 16 to the second portion 20, as shown in FIG. 7, e.g., from the proximal end 14 to the interface of the intermediate portion 18 and the second portion 20. In other words, the corrugations 24 taper toward the longitudinal axis A from the first portion 16 to the second portion 20. The taper of the corrugations 24 may be constant, as shown in the Figures. The corrugations 24 may resist buckling of the sides 44. The corrugations 24 provide greater reinforcement when the corrugation 24 is relatively deep, i.e., at the proximal end 14, and provide less reinforcement when the corrugation 24 is relatively shallow, i.e., at the interface of the intermediate portion 18 and the second portion 20.

The corrugations 24, the spines 46, and the ribs 48 provide the crush can 12 with axial stability. Specifically, upon application of the force F, the corrugations 24, spines 46, and ribs 48 guide the buckling of the crush can 12 to proceed in sequence from the second portion 20, to the intermediate portion 18, to the first portion 16.

As set forth above, the sides 44 of the crush can 12 may vary along the longitudinal axis A. Specifically, the sides 44 may narrow in a direction from the proximal end 14 to the distal end 22.

Due to the thickness and material type of the crush can 12, the collapse of the crush can 12 is a function of a ratio of wall thickness T to the length L of one side 44. Specifically, upon an application of force along the longitudinal axis A at the distal end 22, the crush can 12 buckles first at the side 44 that has the smallest T/L ratio. Since the second portion 20 is free of corrugations 24 and ribs 48, the length L of the sides 44 of the crush can 12 are the greatest at the second portion 20. As such, since the thickness T is substantially constant from the proximal end 14 to the distal end 22, the ratio of T/L is the smallest at the second portion 20, which results in the second portion 20 buckling before the intermediate portion 18 and the first portion 16 upon application of force along the longitudinal axis A at the distal end 22.

Further, since the corrugations 24 taper from the proximal end 14 to the second portion 20, as set forth above, the corrugations 24 provide less reinforcement to the intermediate portion 18 and greater reinforcement to the first portion 16. As such, the corrugations 24 encourage buckling of the intermediate portion 18 before buckling of the first portion 16. The taper of the ribs 48 along the intermediate portion 18 and the constant cross-section of the ribs 48 along the first portion 16 also encourages the intermediate portion 18 to buckle before the first portion 16.

The design of the corrugations 24, sides 44, and ribs 48 of crush can 12 to encourage sequential collapse of the crush can 12 beginning at the second portion 20, then at the intermediate portion 18, then at the first portion 16, allows for the crush can 12 to be formed of UHSS, such as Boron steel, at a relatively small thickness, e.g., about 1.1 mm, as set forth above. This configuration reduces the weight of the crush can 12.

The disclosure has been described in an illustrative manner, and it is to be understood that the terminology which has been used is intended to be in the nature of words of description rather than of limitation. Many modifications and variations of the present disclosure are possible in light of the above teachings, and the invention may be practiced otherwise than as specifically described.

What is claimed is:

1. A vehicle comprising:
    a frame; and
    a crush can extending along a longitudinal axis;
    the crush can including a first portion fixed relative to and proximal to the frame, a second portion distal to the frame, and an intermediate portion extending from the first portion to the second portion;
    the crush can including concave corrugations relative to an outer surface of the crush can and elongated along the longitudinal axis on the first portion and terminating on the intermediate portion; and
    ribs and spines positioned in alternating arrangement circumferentially about the longitudinal axis with one of the corrugations disposed between each rib and spine, the corrugations, the ribs, and the spines each having different cross-sections at the first portion.

2. The vehicle as set forth in claim 1 wherein the crush can extends from a proximal end on the first portion to a distal end on the second portion, the first portion, intermediate portion, and second portion tapering from the proximal end to the distal end.

3. The vehicle as set forth in claim 2 wherein the corrugations taper from the first portion toward the second portion.

4. The vehicle as set forth in claim 2 wherein the crush can has a wall thickness that is substantially constant from the proximal end to the distal end.

5. The vehicle as set forth in claim 4 wherein the substantially constant wall thickness is about 1.1 millimeters.

6. The vehicle as set forth in claim 1 wherein the corrugations taper from the first portion toward the second portion.

7. The vehicle as set forth in claim 1 wherein each rib tapers toward the longitudinal axis in a direction from the first portion toward the second portion.

8. The vehicle as set forth in claim 7 wherein the corrugations taper toward the longitudinal axis in a direction from the first portion toward the second portion.

9. The vehicle as set forth in claim 1 wherein the crush can is formed of ultra high strength steel.

10. The vehicle of claim 1 further comprising a bumper beam coupled to the second portion.

11. The vehicle of claim 10 wherein the crush can extends from a proximal end on the first portion to a distal end on the second portion, and further comprising a front plate fixed to the distal end and to the bumper beam, and a rear plate fixed to the proximal end and to the frame.

12. A vehicle crush can comprising:
    a first portion;
    a second portion spaced from the first portion;
    an intermediate portion extending from the first portion to the second portion;
    the first portion, second portion, and intermediate portion being aligned on a longitudinal axis and tapering from the first portion to the second portion; and
    concave corrugations relative to an outer surface of the crush can and elongated along the longitudinal axis on the first portion and terminating on the intermediate portion; and
    ribs and spines positioned in alternating arrangement circumferentially about the longitudinal axis with one of the corrugations disposed between each rib and spine, the corrugations, the ribs, and the spines each having different cross-sections at the first portion.

13. The crush can as set forth in claim 12 wherein the corrugations taper from the first portion to the second portion.

14. The crush can as set forth in claim 12 further comprising a proximal end on the first portion and a distal end on the second portion, the crush can tapering from the proximal end to the distal end.

15. The crush can as set forth in claim 12 further comprising a wall thickness that is substantially constant from the proximal end to the distal end.

16. The crush can as set forth in claim 15 wherein the substantially constant wall thickness is about 1.1 millimeters.

17. The vehicle as set forth in claim 12 wherein the crush can is formed of ultra high strength steel.

* * * * *